(12) United States Patent
Pullen et al.

(10) Patent No.: US 6,912,773 B2
(45) Date of Patent: Jul. 5, 2005

(54) METHOD OF FORMING A WINDING DISC FOR AN AXIAL FIELD ELECTRICAL MACHINE

(75) Inventors: Keith Robert Pullen, Acton (GB);
Arnoldo Fenocchi, Wimbledon (GB);
Mohammad Reza Etemad, East Sheen (GB)

(73) Assignee: The Turbo Genset Company Limited (GB)

( * ) Notice: Subject to any disclaimer, the term of this patent is extended or adjusted under 35 U.S.C. 154(b) by 0 days.

(21) Appl. No.: 10/290,025

(22) Filed: Nov. 7, 2002

(65) Prior Publication Data

US 2003/0173858 A1 Sep. 18, 2003

(30) Foreign Application Priority Data

Nov. 7, 2001 (GB) .............................................. 0126758

(51) Int. Cl.[7] ................................................ H01F 7/06
(52) U.S. Cl. ........................... 29/606; 29/592.1; 29/596; 29/598; 29/602.1; 29/605; 140/92.1; 140/92.2; 310/178; 310/208
(58) Field of Search ................................. 29/592.1, 596, 29/598, 602.1, 605, 606; 310/179, 208; 140/92.1, 92.2

(56) References Cited

U.S. PATENT DOCUMENTS

| | | | | |
|---|---|---|---|---|
| 4,125,792 A | * | 11/1978 | Schmider ..................... | 310/268 |
| 4,340,833 A | * | 7/1982 | Sudo et al. .................. | 310/268 |
| 4,691,746 A | * | 9/1987 | Sedgewick ................. | 140/92.1 |
| 4,959,578 A | * | 9/1990 | Varga ......................... | 310/268 |
| 5,723,933 A | | 3/1998 | Grundl et al. | |

FOREIGN PATENT DOCUMENTS

| | | |
|---|---|---|
| DE | 299 07 751 U1 | 1/2000 |
| GB | 2 338 117 A | 12/1999 |
| JP | 03265437 A * 11/1991 | ............ H02K/3/04 |

* cited by examiner

*Primary Examiner*—Paul D Kim
(74) *Attorney, Agent, or Firm*—Kaplan & Gilman, LLP (57) ABSTRACT

The invention provides a stator coil construction in which the thickness of the stator windings is reduced without the need for interconnections within the stator. The reduction in thickness of the stator windings is accomplished by wire flattening.

16 Claims, 8 Drawing Sheets

METHOD OF FORMING A WINDING DISC FOR AN AXIAL FIELD ELECTRICAL MACHINE

FIELD OF THE INVENTION

The present invention relates to an axial flux rotary electrical machine and in particular an improved stator coil construction for such a machine.

BACKGROUND OF THE INVENTION

Axial flux electrical machines offer many advantages over conventional machines but there are considerable technical challenges to overcome to achieve practical and efficient machines. GB-A-2,222,031 and GB-A-2,261,327 both describe axial field machines designed to operate at very high speeds with high efficiency. WO 96/38901 describes further improvements to such machines in order to provide a machine which has improved mechanical and electrical reliability as well as improved cooling and electrical characteristics. All these elements combine to provide a machine which is both physically compact but also highly efficient at converting electrical energy into motive power and vice versa.

Figure 11:
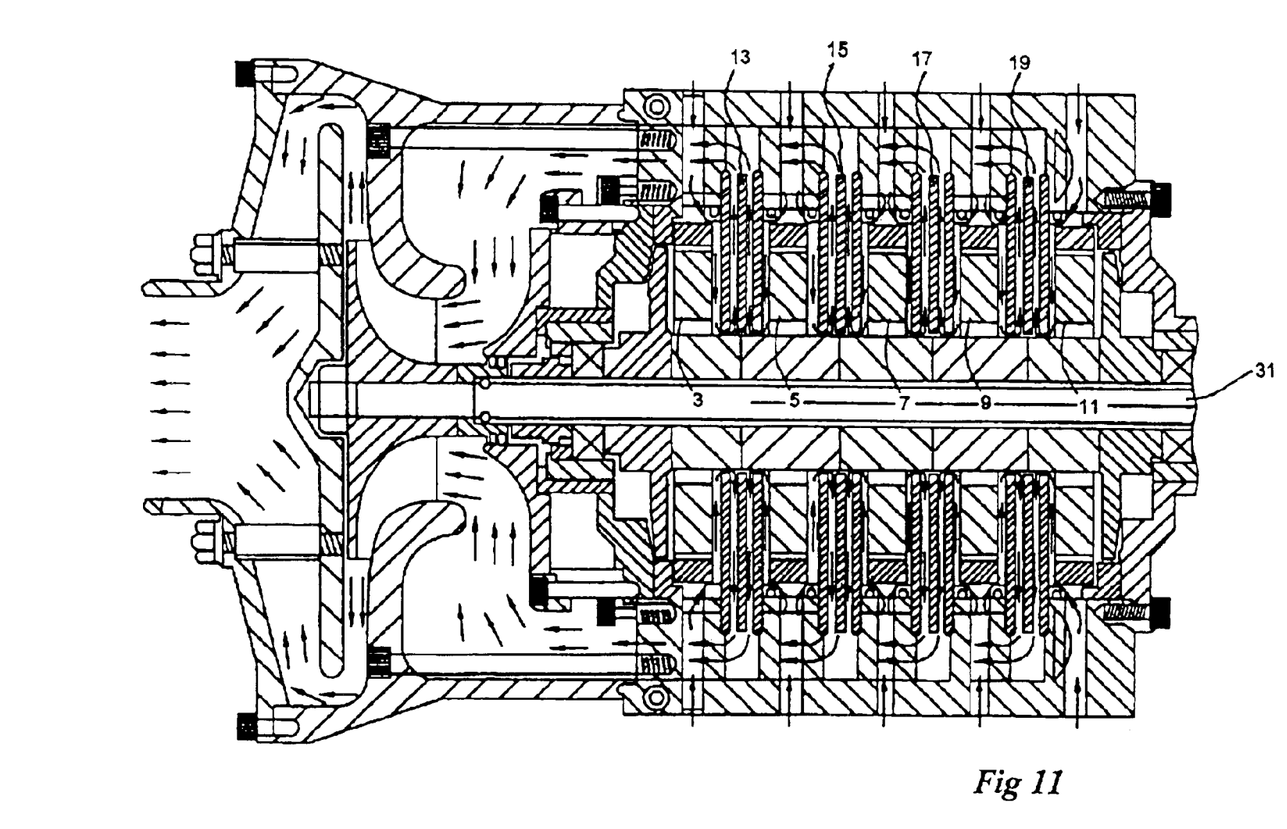
FIG. 11 shows an example of a machine with which the stator disc of the present invention may be used.

The construction of a typical axial flux electrical machine is shown in FIG. 11. As can be seen, the machine comprises a central rotor shaft 31 upon which one or more disc-shaped rotors 3,5,7,9,11 are mounted. Each rotor disc includes a plurality of magnets for producing a magnetic field. The rotor shaft and the rotor discs mounted thereon are mounted in the machine so that they are free to rotate. The shaft is then connected to provide or receive mechanical power to or from whatever the machine is connected to. Interleaved between the rotors are a plurality of generally disc-shaped stators discs 13,15,17,19. These disc-shaped stator discs include a central opening through which the rotor shaft passes. Each of the stator discs includes one or more electrical windings for providing or receiving electrical power. Each winding is typically wound in a separate winding disc, the winding discs together forming the stator disc. In use, the stators are arranged in close proximity to the rotors to maximise the magnetic field strength and thus maintain high efficiency in the machine. The windings in the stators are preferably arranged in coil sectors arranged at equal angles around the stator winding disc.

The output of the electrical machine is strongly dependent upon the axial gap or air gap (although the gap may not be filled with air) between two adjacent rotors. As the size of the air gap is reduced, the magnetic field strength increases. The size of the air gap can be reduced by bringing the rotors closer to the stator, i.e. by reducing the gap between the rotor and the stator. However, there is a practical limit to how close the rotors can be brought to the stationary stator. The rotors rotate at high speed and so the size of the air gap must allow for vibration, thermal expansion, and also the need to cool the machine, often by pumping a cooling fluid between the stator and the rotor.

Another way to minimise the air gap is to reduce the thickness of the stator itself. In low speed machines, the stators can be made thin by forming them from laminar sheets of conductors such as copper mounted on a strong but thin insulator support substrate. Whilst this arrangement is perfectly acceptable for low speed devices, such as motors for magnetic disc drives, when the machine is required to operate at high speeds (to provide high power density) then such stator constructions are not practical.

The reason for this is eddy current losses. This is particularly problematic at high powers, typically above 1 kW. When operating at high speeds (typically above about 10000 rpm) and hence high frequencies, a number of parasitic effects become significant and can significantly reduce the efficiency of the machine if ignored. One of these effects is the generation of localised eddy currents in the windings themselves. The size of these eddy currents depends on the size of the cross-section of the conductors. Thus if the conductor is solid and large in cross-sectional area to allow for high currents, the losses due to such eddy currents are unacceptable. In order to compensate for this, the windings can be made from cables which are formed from bundles of smaller conductors or strands which are insulated from adjacent strands in the bundle to form a winding cable which may typically include a hundred strands, each of a diameter of a fraction of a millimeter. Thus, any eddy currents which develop are confined in each strand and are consequently very small because of the very low cross-sectional area of each individual strand even though the overall conducting cross-section is still large. This allows the windings to carry large currents without the detrimental effect of losses due to eddy currents.

One of the benefits of using multi-strand wire is that re-circulating currents in the windings are avoided or at least minimised. However, if the winding is not formed as a single winding i.e. from a single continuous cable, then it becomes necessary to form connections at one or more points along the length of the winding. However, if such connections are to be formed, then each individual strand of the hundred or so strands which form the winding cable must be individually connected and connections to the other strands must be avoided to prevent the formation of loops through which recirculating currents might flow. Consequently it is undesirable to have any connections within the winding because this makes the construction of the stator extremely complicated and expensive and also reduces the reliability of the finished stator.

This presents a problem in terms of forming a thin stator disc because if the winding is to be formed as a single continuous winding without connections, each of the coil sectors must be formed from the same winding. Windings are preferably formed as a number of spiral coil sectors arranged around the stator winding disc. This means that as the winding is wound towards the centre of a spiral coil, the winding must be continued from the centre of the spiral of the coil sector to form the start of the spiral of the next coil sector. This problem is often overcome in the prior art by forming through-connections from one side of a support structure for the winding, to the other side where another coil winding winds in the opposite direction so that it is relatively straightforward to connect to the next coil sector. However, this requires a through connection or in the case of the required continuous cable, winding from both the top and underneath. This is physically extremely difficult to achieve. Even if the teaching of the prior art was applied to an arrangement for a high speed/high power machine, this would result in a winding having a minimum axial thickness which would be approximately twice that of the multi-strand winding. If the windings are then attached to a support structure or encapsulated in a support medium, the winding would be even thicker. Furthermore, where the machine is a three phase machine, it is necessary to have three separate winding discs which are arranged axially side-by-side to form each stator disc. In addition it is usually necessary to provide channels between each of the phase windings to provide a space for cooling fluid to pass therethrough. All this would result in a very thick stator disc and consequently a very large air gap between pairs of rotor discs, leading to poor magnetic field strength and efficiency. Cooling of a thicker disc is also more difficult due to the increased distance for the heat to travel axially.

One solution suggested in the prior art is to have the winding continue from the centre of each coil sector passing out across each of the circuits of the spiral in a generally perpendicular direction. However, this still results in the problem of having a stator winding disc which has a thickness at least twice the diameter of the winding cable.

SUMMARY OF THE INVENTION

It is therefore an object of the invention to provide an improved stator which overcomes or ameliorates some or all of the problems of the prior art.

Therefore, according to the present invention there is provided a winding disc for an axial field electrical machine, the winding disc having:

a winding formed into a plurality of sectors, wherein at least one of said sectors has a generally spiral arrangement and includes a bridging portion continuing from the centre of the spiral and bridging across some or all of the turns of the spiral, wherein the bridging portion is flattened in the axial direction of the winding disc.

References to flattened in the specification signify that the cross-section of the winding cable has a reduced dimension in the axial direction when compared to the rest of the winding cable. For example, the winding cable is preferably generally circular in cross-section. However, in the pressed portions, the cross-sectional dimensions are axially reduced and enlarged in the plane compared to the rest of the winding.

This arrangement allows the winding to be formed from a single continuous cable which continues from the centre of the spiral to the outer part of the spiral by bridging across to each of the turns of the spiral but whilst also restricting the thickness of the winding disc and hence the overall stator disc to a minimum.

In addition, by causing some compression of the turns of the winding which pass below the bridging portion, a further reduction in the overall thickness of the stator disc can be achieved such that the overall thickness of the winding disc is similar to the original diameter of the winding cable. It is also possible to compress the winding further to produce a thickness actually less than the original cable diameter. Thus, a winding disc can be provided which has virtually the minimum thickness feasibly possible without the need for complex winding arrangements or connections, whilst still minimising the parasitic effects which can occur when operating at high speed and high power.

As a further feature of the present invention, when the cable is laid out in the spiral formation, the individual turns of the spiral can be spaced apart at the portion where the cable bridges across from the centre of the spiral. In addition, the spaced apart portion of the winding can be pre-compressed prior to the portion of the cable which bridges the spiral being put in place. The pre-compressed cables provide a trough into which the bridging part of the cable can sit. In this way when the complete winding is compressed, the bridged part of the winding can be compressed into an even flatter configuration due to the increased width in which the cable can be compressed. Furthermore, because the cables are pre-compressed, the bridging part of the cable can also be spread out further by virtue of the increased space available in which to expand sideways. In this way, the combination of the reduction in thickness of both the bridged and bridging parts of the cable mean that the overall thickness of the winding disc is reduced even further.

The present invention further provides a method of forming a winding disc for an axial field electrical machine comprising:

laying out a winding as a plurality of sectors, and in each of one or more sectors, forming a spiral winding section in a generally spiral configuration; for each spiral winding section, forming a bridging portion of winding passing from the centre of the spiral winding section to the outer part of the spiral winding section over bridged portions of the winding forming the spiral winding section; and pressing the laid-out winding in a direction perpendicular to the plane of the disc.

As indicated above, the method of the present invention provides a way of forming a winding disc which, whilst including cross-over sections or bridging portions, can still be reduced in thickness to the same as or less than the thickness of the winding cable itself.

Once formed, the winding is preferably encapsulated in an electrically insulating material. For example, a thermosetting resin such as epoxy may be used, preferably with a suitable powder filler, although other systems of encapsulation may be used. Encapsulation can take place after the pressing step once the winding has been formed into the desired shape and thickness. Alternatively, the windings may be coated with the uncured resin prior to pressing and then the resin may be consolidated during the pressing process. In this way excess resin and air can be expelled.

One or more sheets of fibreglass mat may be added to one or both sides of the winding prior to curing of the encapsulation material. In this way, the mats are incorporated into the structure of the winding disc to provide additional mechanical strength to the otherwise relatively thin winding discs.

During the pressing step, high forces are applied to the winding which are initially localised on the bridging portions of the winding. Consequently, a thin small sheet of tough insulator such as Kapton® can be placed between the bridging portion of the winding and the part of the winding being bridged. This protects against abrasion between the wires during the pressing step. Once the bridging portions are compacted, the entire stator can be further reduced in axial thickness by additional pressing.

After pressing, the dimension of the bridging portion in the axial direction of the machine is preferably reduced to less than 50% of the original diameter of the cable more preferably to less than 30% and even more preferably to less than 20% of the original diameter. The width of the cable in the plane of the stator disc will correspondingly increase, conserving volume. The dimensions of the windings beneath the bridging portion, in the axial direction of the machine, are preferably reduced to less than 75% of the original diameter of the cable and more preferably to less than 65%. Advantageously, these windings fill the spaces between each other, in the region beneath the bridging portion.

DESCRIPTION OF EXEMPLARY EMBODIMENTS

A specific embodiment of the present invention will now be described in detail by reference to the accompanying drawings.

Figure 1:
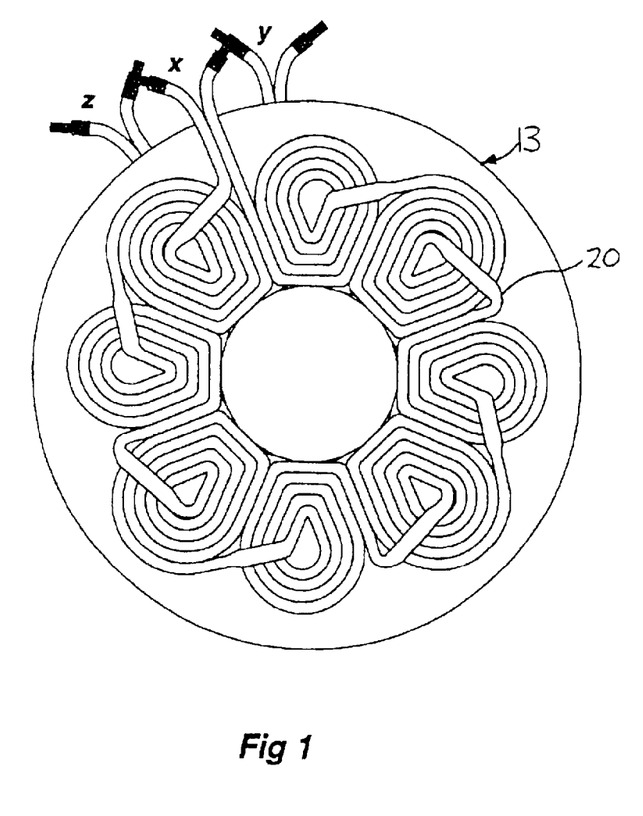
FIG. 1 shows a schematic plan view of a stator disc according to the present invention.
Figure 2:
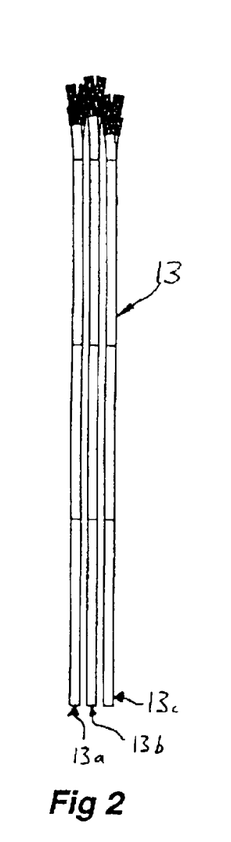
FIG. 2 shows a side view of the stator disc of FIG. 1.

FIGS. 1 and 2 show one embodiment of the present invention. As can be seen in FIG. 2, the stator disc comprises three separate winding discs 13a, 13b and 13c. Each of these winding discs is substantially identical to the other but arranged so that they are angularly offset from each other as can be seen from the three phase connections x, y, z shown in FIG. 1. Each of the winding discs are attached to each other, preferably with a space therebetween to allow cooling fluid to pass through to assist in cooling the stator.

As indicated above, each of the winding discs is substantially identical. Therefore only one such winding disc is described in detail below.

FIG. 1 shows a layout of the windings according to one embodiment of the present invention. In this example, the windings are formed from a single continuous cable which is formed into eight spirally wound coils. Whilst this arrangement provides a useful practical construction, it is not intended that the present invention be limited to such an arrangement. For example, the number of coils could be more or less than eight and the coils need not have the specific shape shown in FIG. 1. Furthermore, as the present invention principally relates to minimising the thickness of a winding by compressing a part of the winding which bridges other parts of the winding then the present invention could be applied to any number of variations where it is necessary to have such a bridging portion, in order to provide the desired direction of current flow in the appropriate regions of the stator.

Figure 4A:
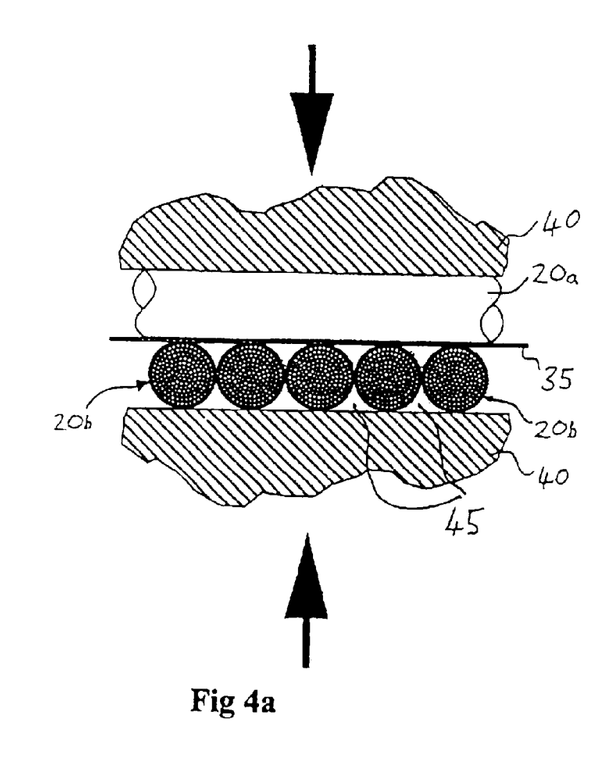
FIGS. 4a and 4b show cross-sectional views at perpendicular angles through a portion of the winding prior to pressing.
Figure 4B:
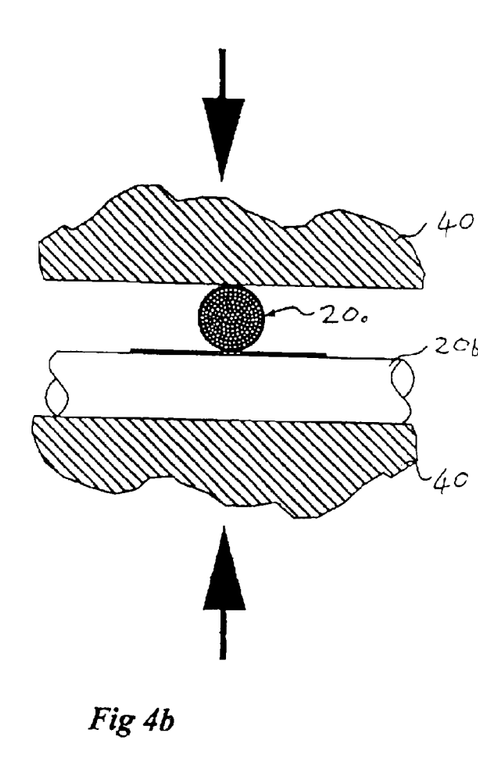

In the arrangement of FIG. 1, it is apparent that as the winding spirals towards the centre, it is necessary to bring the winding out from the centre of the coil to the start of the next winding, or to the external connection of the winding disc. As a result, the portion of the winding which passes over the previous turns of the coil must sit on top of those previous turns. Consequently, the bridging portion lies out of the plane of the other parts of the winding. This can be seen in FIGS. 4a and 4b. FIG. 4a shows a cross-section through a part of the winding discs where the bridging portion 20a crosses over the other parts of the winding 20b. FIG. 4a shows a cross-section along the longitudinal axis of the bridging portion 20a and FIG. 4b shows a cross-section perpendicular to the longitudinal axis of the bridging portion 20a. FIGS. 4a and 4b both show partial views of the anvils 40 which are used to press the windings, as described below. As can be seen from FIGS. 4a and 4b, prior to pressing the overall thickness of the combined windings is approximately twice the diameter of the winding cable. Although the cable is illustrated in the figures as having a generally circular cross-section, this is not essential. The beneficial effect of the present invention can still be achieved with any shape of cross-section of the winding cable. However, the cables are generally formed in a circular section as this is most convenient for manufacturing the cable.

Once the cable has been laid out, as generally shown in FIG. 1 (although FIG. 1 shows the view of the stator disc after pressing), the winding layout is then placed between the anvils 40 of a pressing machine. The anvils apply axial force to the winding which is sandwiched therebetween. As force is applied to the winding, the load is concentrated onto the bridging portions 20a which causes them to be compressed to a large extent in comparison to the windings 20b beneath the bridging portions. This is because the load applied to each of the bridging portions is shared between several of the windings 20b lying beneath the bridging portion. Thus the load applied to the bridging portion 20a is shared between several of the windings 20b. In the example shown in FIGS. 4 and 5 there are five such windings 20b. However, the force applied to the windings 20b still causes them to be deformed and to take up a shape which effectively fills most of the space 45 between each of them, simultaneously reducing their axial thickness. Thus, the combination of the considerable reduction in the axial thickness of the bridging portion 20a and the reduction in the axial thickness of the windings 20b causes an overall reduction in the axial thickness of the winding and hence the winding disc which it ultimately forms.

During the compression stage, the force applied is concentrated onto the bridging portions and to prevent damage to the insulation on the bridging portion and also the windings 20b beneath it, a small thin sheet of tough insulator such as Kapton is placed between the bridging portion 20a and the windings 20b. The thickness of the sheet is insignificant in terms of the overall thickness of the winding but allows the windings to move relative to each other without damaging the insulation.

Figure 3:
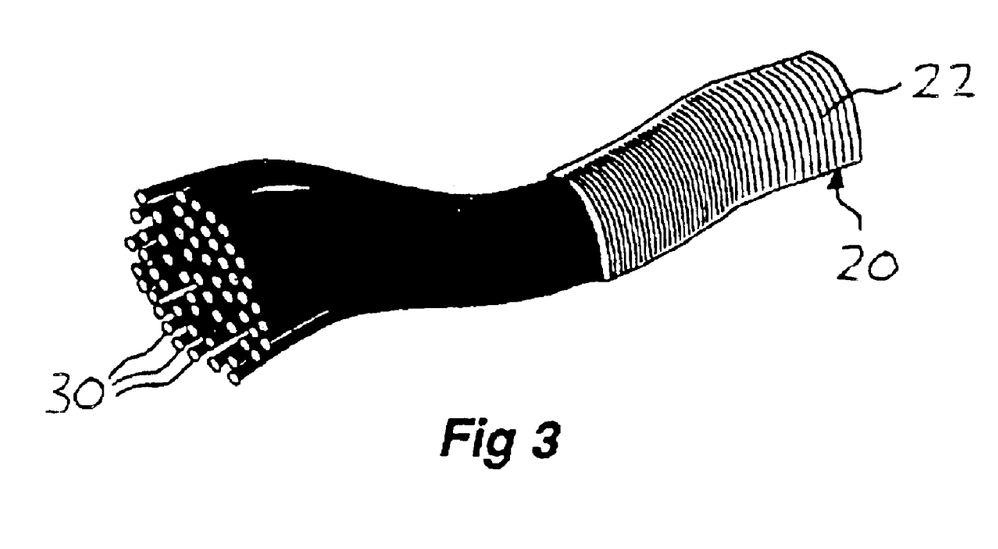
FIG. 3 shows a view of the arrangement of the multi-strand windings used in the present invention.

The cable used to form the winding is a multi-strand cable such as that shown in FIG. 3. The cable includes a plurality of strands 30, typically 100 in number which are twisted together. The strands are normally held together by means of a sleeve 22 such as a thin wrap of silk or synthetic fibre. FIG. 3 shows the sleeve partially removed to show each of the individual strands 30 of the cable 20. In some cases, this sleeving can be omitted if the bundling of the strands is carefully done in order to prevent unravelling. Removal of the sleeving is beneficial for making the stator even thinner.

Each of the strands is generally manufactured from copper with a suitable varnish coating to insulate them from adjacent strands. This multi-strand arrangement allows the cable to be compressed and deformed quite considerably because the strands can move relative to each other. Thus, when a load is applied, the cable 20 which forms the bridging portion 20a can be deformed quite considerably as can be seen from FIGS. 5a and 5b, which shows the cable after pressing.

Figure 5A:
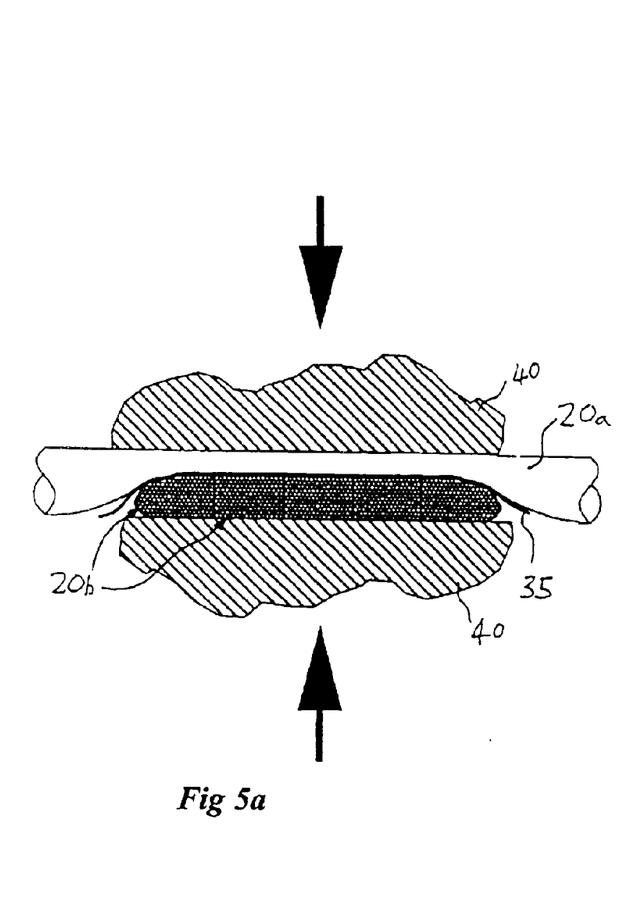
FIGS. 5a and 5b show cross-sectional views corresponding to FIGS. 4a and 4b respectively after pressing.

As can be seen from FIG. 5a, the lower windings 20b are compressed to a generally rectangular shape and the voids 45 between the windings which are shown in FIG. 4a have been filled in. This allows the axial dimension of the windings 20b to be reduced significantly. Referring to FIG.

Figure 5B:
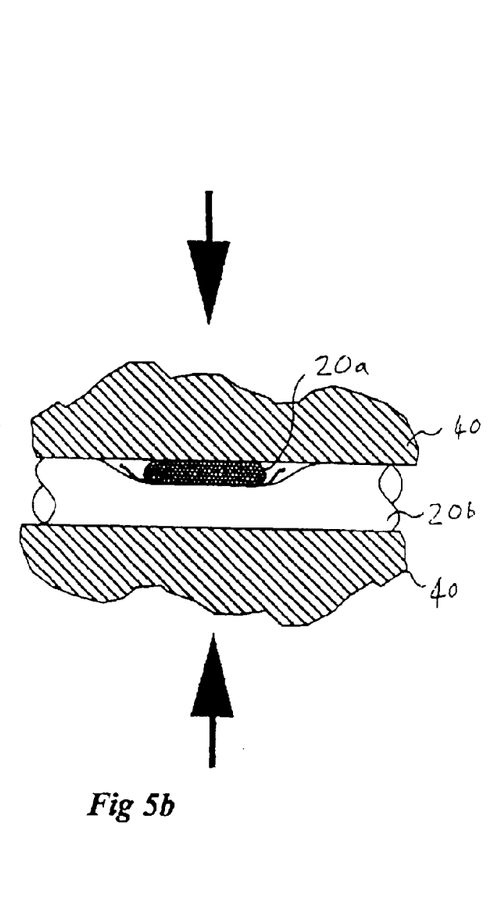

5*b*, the effect of the compression of the winding is even more dramatic on the bridging portion 20*a*. There are no other windings on either side of the bridging portion and so there is nothing to restrain the winding from splaying out sideways such that the width of the winding increases considerably but the height in the axial direction is considerably reduced. The overall result of this pressing operation is that the total thickness of the resultant winding (i.e. the axial thickness of the bridging portion and the lower windings) is reduced in the axial direction almost to the original diameter of the winding cable 20.

Figure 6:
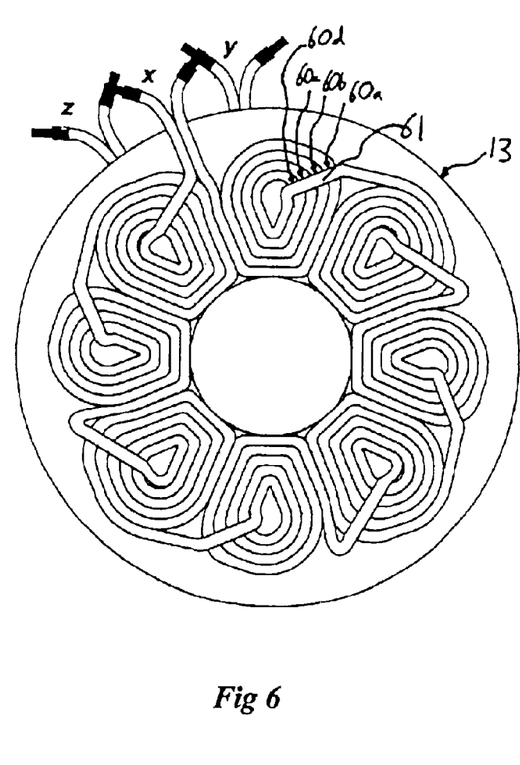
FIG. 6 shows a schematic plan view of a stator disc according to an alternative construction of the present invention after a pre-compression stage but before the main pressing stage.
Figure 7:
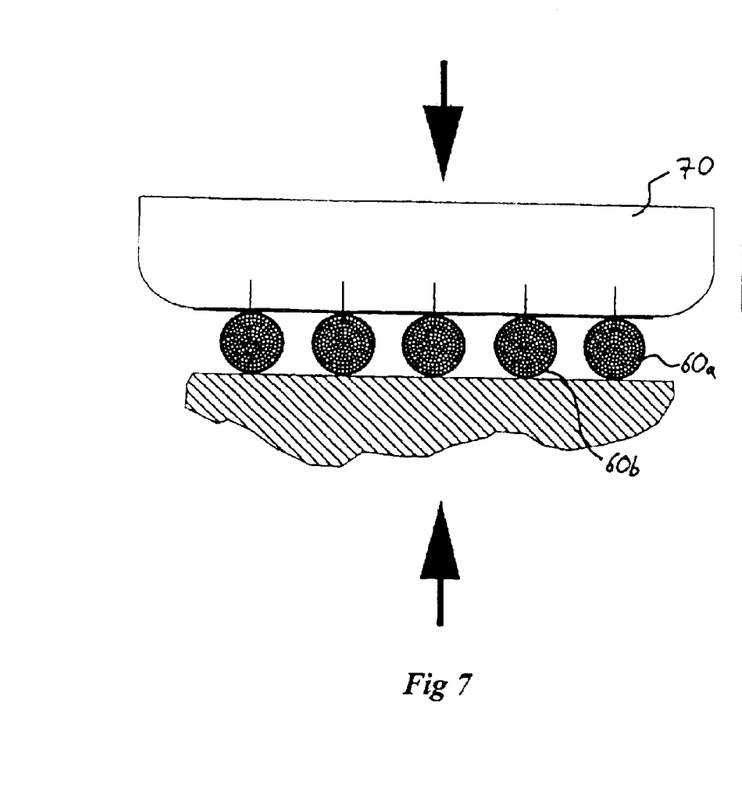
FIG. 7 shows a cross-sectional view through a portion of the winding prior to a pre-compression stage in an alternative instruction.

Whilst the above described arrangement provides a considerable reduction in the overall thickness of the winding while still maintaining a single continuous winding, it is desirable to further reduce the thickness of the winding disc to minimize the thickness of the overall stator. In FIG. 6, there is shown a winding disc which has been arranged to provide additional space to allow greater compression of the windings so as to allow a greater reduction in the height of both bridged and bridging portions of the cable. As can be seen from FIG. 6, the cable is laid out in the spirals in a similar manner to that shown in FIG. 1 but at the portions 60 of the cable which underlie the bridging portion, the turns of the cable are deliberately laid down in a slightly spaced apart configuration, as can be seen in FIG. 7. Once the spiral has been laid down and prior to the bridging portion 61 being laid across the spirals, the winding is subjected to a pre-compression stage in which the bridged windings 60*a*–*d* are locally compressed along the path of the bridging winding 61.

Whilst the spacing of the cable causes a slight bulging of the spiral, this does not significantly affect the operation of the device and the bulge can be accommodated in the space between the spirals as shown in FIG. 6.

FIG. 7 shows the spaced about windings prior to the pre-compression step. Load is applied via an anvil 70 or the like to cause the turns of the winding cable to be compressed. Because the individual windings are spaced apart from each other, there is a greater space between them to allow for sideways expansion of the winding as it is compressed. Thus, assuming the volume of each winding is conserved, the thickness of each winding after compression is considerably less than that than if the windings were adjacent to each other initially.

Figure 8:
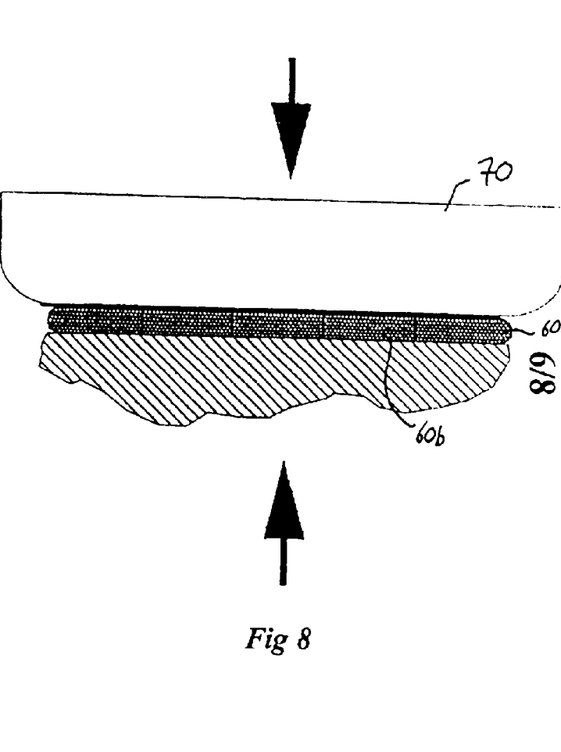
FIG. 8 shows the view of FIG. 7 after the pre-compression stage.

FIG. 8 shows the windings after the pre-compression stage. As can be seen from this figure the windings are compressed to a much greater extent than where the windings are laid out adjacent to each other. FIG. 5*a* shows the arrangement of the windings after they have been compressed when they are initially laid out side by side. Comparing the windings after pre-compression, as shown in FIG. 8, and those shown in FIG. 5*a*, it is apparent that the overall thickness of the windings is considerably less.

The pre-compression stage is preferably carried out without the bridging winding 61 in place. This pre-compression stage may be carried out as each spiral winding is completed and prior to the bridging part of the winding being laid in position. Alternatively, the entire winding may be laid out but with the bridging portion arranged slightly out of position so that the anvil 70 can be brought to bear upon the (to be) bridged windings without being obstructed by the bridging winding 61. After the pre-compression stage then the bridging windings 61 can be moved into their appropriate position. This latter method allows the pre-compression of the windings to be carried out in a single step rather than after the formation of each individual spiral.

Figure 9:
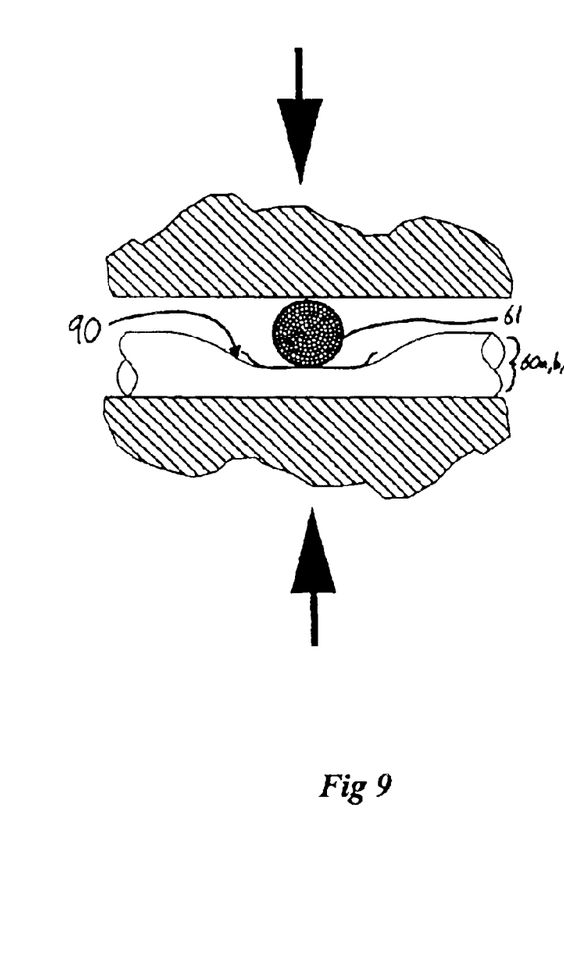
FIG. 9 shows a cross-sectional view through a portion of the winding of the alternative construction, prior to pressing.
Figure 10:
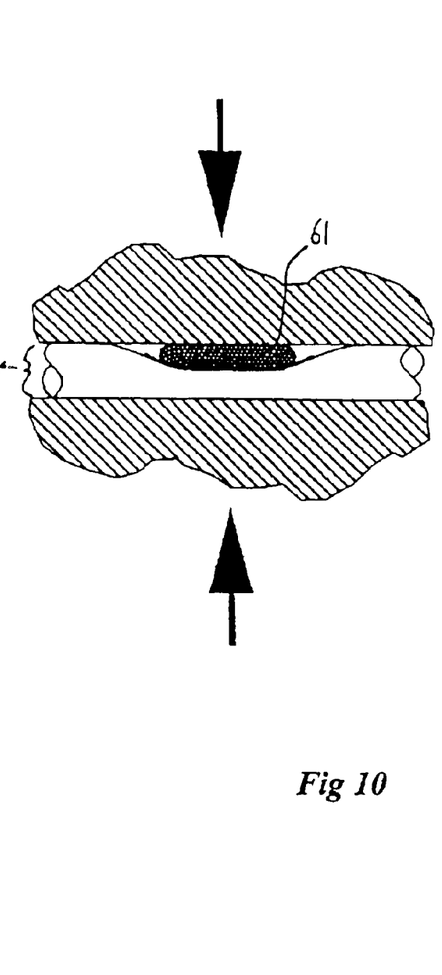
FIG. 10 shows the view of FIG. 9 after pressing.

Once the windings have been lay out and the pre-compression of the bridged windings 60 has been carried out, the bridging portion of the winding 61 is located in its uncompressed state in the trench 90 defined by the compression of the bridged portions of the winding by the anvil 70. This is shown in FIG. 9. From this arrangement, the compression stage, as described previously in respect of the first embodiment of the present invention, is carried out. However, because the bridged portions of the windings 60 have been pre-compressed to define the trench 90, they are already much thinner than they would have been and define a space either side of the bridging winding 61 into which it can expand. Thus as the compression stage is carried out, the resulting compressed winding 61, as shown in FIG. 10, is considerably thinner than that shown in FIG. 5*b*. Consequently, further compression of the remainder of the winding can be carried out, to reduce the thickness of the winding to less than the original diameter of the cable used to form the winding and thus reduce the overall thickness of the resulting winding disc.

After the pressing stage, the winding is then encapsulated in an electrically insulating material. Typically a thermosetting resin, such as epoxy is used with a suitable powder filler, although other systems of encapsulation can be used. This encapsulation step takes place after the winding has been pressed into shape. Whilst it is desirable to have a thin winding disc for the reasons described previously, reduced thickness can lead to reduced mechanical strength simply because there is less reinforcing material in the reduced thickness. In order to improve the mechanical strength of the disc, one or more sheets of fibreglass mat can be added to one or both sides of the winding disc prior to or after curing of the encapsulation material. This forms a composite fibre reinforced structure which is much stronger than the basic encapsulated winding. Other fibrous materials can be used instead of fibreglass.

Although it is indicated above that encapsulation takes place after pressing the winding, it is possible to coat the windings with the uncured resin prior to pressing and then carry out the pressing with the resin in place. This pressing helps to consolidate the resin and to expel excess resin and air. The resin is then cured to form the composite structure as before.

What is claimed is:

1. A method of forming a winding disc for an axial field electrical machine comprising:

laying out a winding as a plurality of sectors, and in each of one or more sectors, forming a spiral winding section in a generally spiral configuration, for each spiral winding section, forming a bridging portion of winding passing from a centre of the spiral winding section to an outer part of the spiral winding section over bridged portions of the winding forming the spiral winding section;

pressing the laid-out winding in a direction perpendicular to a plane of the disc; and locally pressing the bridged portions of the winding prior to forming the bridging portion.

2. The method according to claim 1 wherein the winding is laid out with adjacent windings of each turn substantially in contact with each other.

3. The method according to claim 1 wherein an encapsulating material is applied to the winding prior to pressing and then cured after pressing has begun.

4. The method according to claim 1 wherein an encapsulating material is applied to the winding after pressing and then cured.

5. The method according to claim 1 wherein the winding has a generally circular cross-section prior to pressing.

6. A method of forming a winding disc for an axial field electrical machine comprising:

laying out a winding as a plurality of sectors, and in each of one or more sectors, forming a spiral winding section in spiral configuration;

for each spiral winding section, forming a bridging portion of winding passing from a centre of the spiral winding section to an outer part of the spiral winding section over bridged portions of the winding forming the spiral winding section; and pressing the laid-out winding in a direction perpendicular to the plane of the disc, wherein the winding is laid out with adjacent windings of each turn substantially in contact with each other, except at the portions which are to be bridged by the bridging portion, where they are spaced apart from each other.

7. The method according to claim 6 further comprising locally pressing the bridged portions of the winding prior to forming the bridging portion.

8. The method according to claim 7 wherein the local pressing is applied along a path in which the bridging portion is to be laid.

9. A method of forming a winding disc for an axial field electrical machine comprising:

laying out winding wire in a plurality of sectors, and in each of one or more sectors, forming a winding section in a generally spiral configuration, for each winding section, forming a bridging portion of winding wire passing from a centre of the winding section to an outer part of the winding section over bridged portions of the winding wire forming the winding section;

pressing the laid-out winding disc a direction perpendicular to a plane of the disc to reduce the axial dimension of the winding disc where the bridging portion passes over the bridged portions; and locally pressing the bridged portions of the winding wire prior to forming the bridging portion.

10. The method according to claim 9 wherein the winding wire is laid out with adjacent windings of each turn substantially in contact with each other.

11. The method according to claim 9 wherein an encapsulating material is applied to the winding disc prior to pressing and then cured after pressing has begun.

12. The method according to claim 9 wherein an encapsulating material is applied to the winding disc after pressing and then cured.

13. The method according to claim 9 wherein the winding wire has a generally circular cross-section prior to pressing.

14. A method of forming a winding disc for an axial field electrical machine comprising;

laying out winding wire in a plurality of sectors, and in each of one or more sectors, forming a winding section in a spiral configuration;

for each winding section, forming a bridging portion of winding wire passing from a centre of the winding section to an outer part of the winding section over bridged portions of the winding wire forming the winding section; and pressing the laid-out winding disc in a direction perpendicular to a plane of the disc to reduce the axial dimension of the winding disc where the bridging portion passes over the bridged portions, wherein the winding wire is laid out with adjacent windings of each turn substantially in contact with each other, except at the portions which are to be bridged by the bridging portion, where they are spaced apart from each other.

15. The method according to claim 14 further comprising locally pressing the bridged portions of the winding wire prior to forming the bridging portion.

16. The method according to claim 15 wherein the local pressing is applied along a path in which the bridging portion is laid.

* * * * *